Patented May 19, 1936

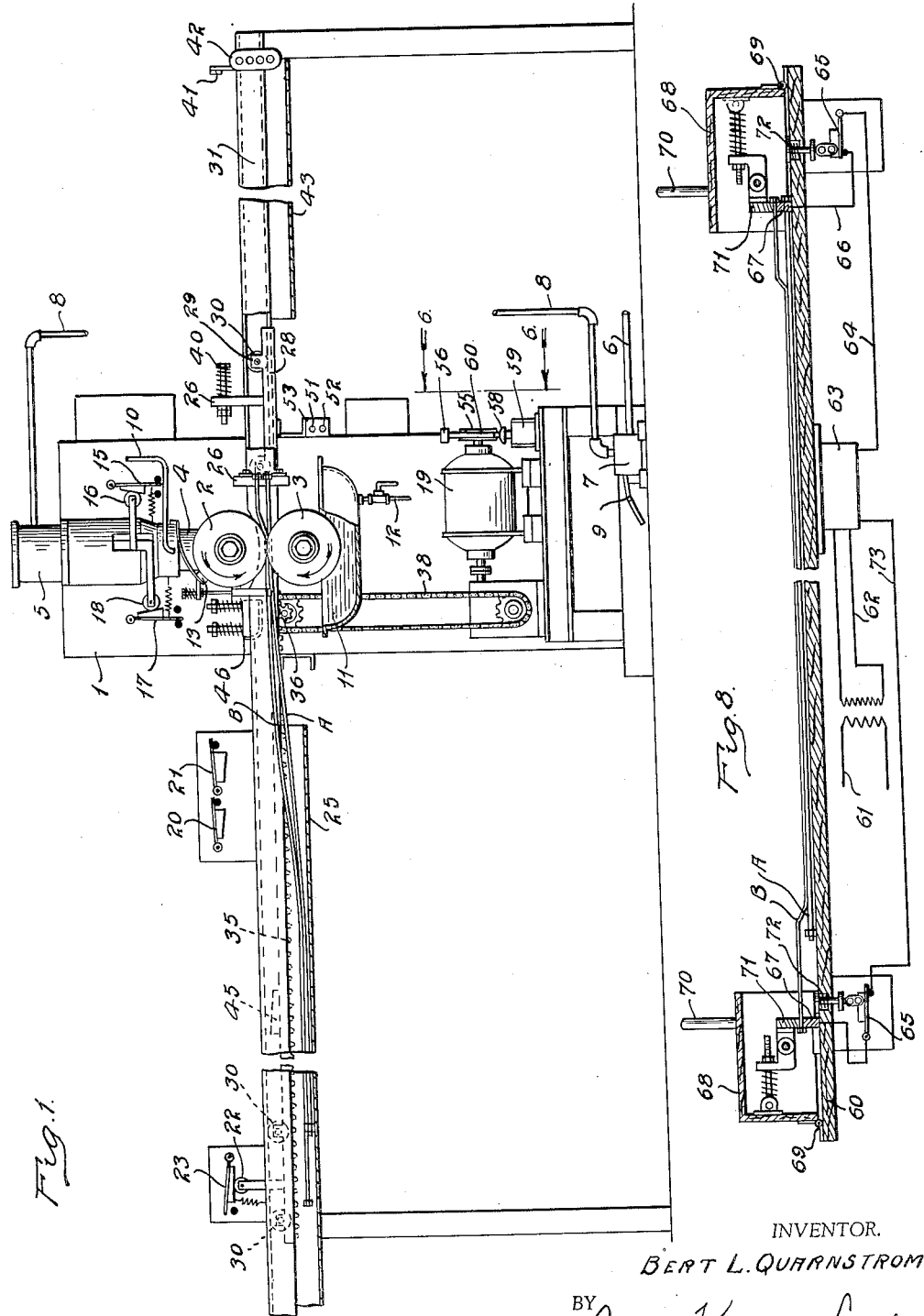

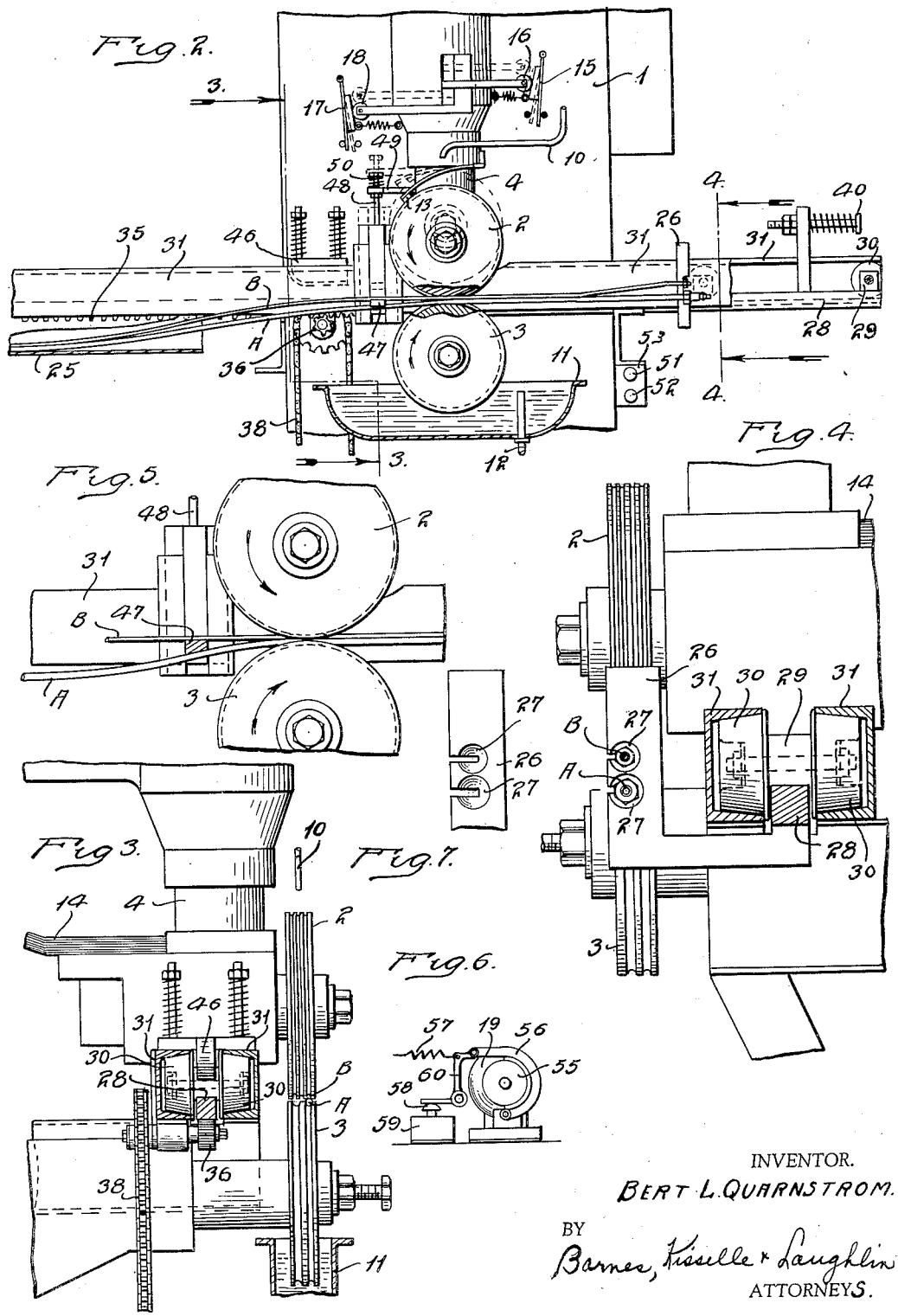

2,040,877

UNITED STATES PATENT OFFICE 2,040,877

METHOD OF AND APPARATUS FOR MAKING AND TREATING TUBE ASSEMBLIES

Bert L. Quarnstrom, Detroit, Mich., assignor to Bundy Tubing Company, Detroit, Mich., a corporation of Michigan Application November 2, 1933, Serial No. 696,358

13 Claims. (Cl. 219—6)

This invention relates to the manufacture of tube lines wherein, for example, two tubes are united into one assembly so that the same may be handled or installed as a unit. More specifically the invention has to do with an apparatus and method of uniting at least two tubes and otherwise treating at least one of them.

One object of the invention is to provide an apparatus and method for uniting at least two tubes into a unit assembly. Another object of the invention is to subject at least one of the tubes to an operation which may be termed an annealing operation, the reasons for which will later appear. Another object of the invention is to provide an apparatus and method for welding together, tubes of different sizes, in which the tubes are handled so that the expanding action incident to the welding heat, in which action the larger tube may exert its power over that of the smaller tube, is substantially neutralized. This object, together with other objects, will be brought out in more detail as the description progresses.

Fig. 1 is an elevational view of a machine constructed in accordance with the invention, showing some parts cut away and some parts in section.

Fig. 2 is an enlarged view partly in section showing welding rollers of the machine Fig. 3 is a sectional view taken substantially on line 3—3 of Fig. 2, showing the welding rollers and a mechanical drive connection for moving the tubes.

Fig. 4 is an enlarged sectional view taken on line 4—4 of Fig. 2.

Fig. 5 is an enlarged, more or less diagrammatic view, illustrating how the larger tube may be handled.

Fig. 6 is a detail view illustrating a brake structure for the driving motor.

Fig. 7 is a detailed view showing a tube pulling bracket.

Fig. 8 is a view, largely in section, showing how a final step in the method may be carried out.

A machine, which may be used in carrying out the invention, is generally illustrated in Fig. 1. The mechanical portions of the machine are shown in detail in the various views. The machine, however, may have certain of its movements controlled by electricity, utilizing electric switches and the like, but the electrical wiring arrangement has not been shown. Several electrical switches are illustrated more or less in a diagrammatical manner, as this is believed to suffice in as much as the switches used may now be purchased on the market. Likewise, the wiring system for such switches is known to those versed in the electrical art.

The general frame or supporting structure of the machine is illustrated at 1, and it is equipped with electrodes advantageously in the form of rollers or wheels 2 and 3, both of which may be idlers mounted on spindles as shown in Fig. 6. These electrodes are perfectly grooved to accommodate tubes and, as shown in Fig. 6, they may have more than one groove so that as one groove becomes worn and defective in use, the roller may be shifted axially to bring another groove into operating position. Electrode 2 has the smaller grooves and, as shown in Fig. 6, it has three of such grooves, while the electrode 3, with the larger grooves, has two of such grooves. The electrode 3 may be disposed on a fixed axis. The electrode 2 may be carried by a plunger 4 reciprocably mounted in a cylinder 5. A suitable supply of air under pressure may be provided through a supply pipe 6 running through a valve 7, and from this valve 7 is a pipe line 8 leading to the cylinder. A pedal 9 may be associated with the valve 7, and when depressed, it admits air pressure into the cylinder and when released, it may exhaust air from the cylinder. This is just one way in which the pipe line may be illustrated, and it is appreciated that different pipe line systems may be employed. When the air is admitted to the cylinder, electrode 2 is depressed and when the air is exhausted, the electrode 2 is raised by suitable means such as a spring (not shown).

In the use of the machine, the tubes to be united are moved or pulled lengthwise between the electrodes causing their rotation. The electrodes may be cooled by a supply of water discharging from pipe 10 onto the electrode 2 and collecting in a basin 11 into which electrode 3 is partially submerged, and flowing from the basin through an outlet pipe 12. A wiper brush 13 may engage the roller 2 to prevent substantial flow of water around the roller on the tube approaching side. A suitable welding current is provided in any manner well-known to those well versed in welding machines, and a flexible laminated conductor 14 (Fig. 6) may be used for connection with the movable electrode, whereas the current may pass from the electrode 3 directly through the axis support member and into the body of the machine.

Having thus described the basic items in the welding machine, the several current controlling switches may now be referred to. A switch 15 acted on by a spring, as shown, may control the welding current and it may be closed by an element such as a roller 16 carried by the plunger 4, which roller may engage a cam element. A switch 17 may control the current for a driving motor and this switch may be normally open so as to be closed by an element such as roller 18. The motor is shown at 19. In Fig. 2, the movable electrode and the switch closing elements 16 and 18 are shown in dotted lines, which is the normal inoperative position, and in which position the switches 15 and 17 are open as illustrated by the dotted line position thereof. When the pedal is depressed by an operator, the plunger is caused to move downwardly so that these parts move to the full line position, as shown in Fig. 2, and the switches 15 and 16 are closed thus making the welding circuit and the circuit for the motor. The motor drives certain mechanism as will later be described until its circuit is broken, at which time the welding circuit is preferably broken. A switch 20 may break the motor circuit, and a switch 21 may break the welding circuit, both of which may be operated by an operating member such as a roller 22 which moves to a place where it ultimately opens the switches 20 and 21. Another motor circuit breaking switch is illustrated at 23, and it may also be opened by the member 22. The purpose of this switch will later be brought out. All of the switches are more or less diagrammatically shown and each switch is illustrated as having an inclined portion or cam element for engagement with the operating members. Such a showing is merely for illustration only.

The tubes which are to be united by the machine are shown in full in Figs. 1 and 8. One tube, as for example, the tube A, may be for the purpose of conducting gasoline from a tank at the rear end of an automotive vehicle to the carbureter; the other tube B is advantageously smaller in size, and is adapted to extend from the tank at the rear of an automotive vehicle to a gauging instrument inside the vehicle, and this tube may constitute a liquid level gauge tube. Through the greater portion of their length, these tubes are united, as illustrated in Fig. 8, preferably leaving their ends free for attachment purposes, and one end of the tube B may be considerably longer than the adjacent end of tube A, since it may be required to extend a greater distance to the gauging instrument. The two tubes unattached to each other may lay in a supporting trough 25. The leading ends, which may be equipped with fittings, may be located in a notched bracket 26 which has recesses 27 adjacent the notches so that the fittings may be embraced and held therein. This bracket is joined to a rack bar 28. The rack bar has connected thereto bracket like members 29 which carry the axles for rollers 30 designed to run in channel guide ways 31. The rack bar 28 carries the operating member 22 through a suitable supporting bracket as shown (Fig. 1). The rack bar has suitable gear teeth which may be on the underside as shown at 35 (Fig. 2) and may be driven by a gear 36, (Fig. 3) which is in turn driven by the motor 19 through suitable means as for example, a chain 38 running over sprockets. The rack may carry a spring pressed plunger 40 adapted to strike an arm 41 of a counter 42 at the end of its movement. A trough or support 43 may be provided for supporting the welded together tubes.

The rack may carry a wedge member 45 adapted to strike and move partially under a spring pressed shoe 46 which shoe projects into the space between the channel guides. This furnishes a positive stop for the rack as will be brought out in the operation of the device. A guide shoe or separator for the tubes is illustrated at 47, and this may be carried by a reciprocable rod 48 having a collar thereon for engagement with a bracket 49 carried by the plunger 4. Preferably a coil spring 50, backed up by a nut or other head on the rod, is placed on the other side of the bracket 49.

In the operation of the machine thus far described, two tubes A and B are positioned substantially as illustrated in Fig. 1 with the fittings on their ends engaged in the recesses 27 of the bracket 26. This is done while the movable electrode is in the dotted line position of Fig. 2. The two tubes are preferably positioned on opposite sides of the divider 47 as illustrated in Figs. 2 and 5. Now, the operator depresses the pedal 9 and the air pressure moves the electrode 2 to the full line position so that the two tubes A and B are engaged in grooves of the roller electrodes and pressed against each other as illustrated in Fig. 3. As the plunger 4 moves down, the switches 15 and 17 are closed thus making the welding circuit and motor circuit. The motor starts operating with the result that the rack starts moving to the right as Fig. 1 is viewed. Looking at Fig. 2 the rack has moved a short distance. The rack thus pulls the two tubes through the welding electrodes and the tubes are accordingly welded together. Where an alternating current is used for the welding circuit, the tubes may be welded together with sort of a stitch weld or spaced welded portions. The welded seam between the tubes is not necessarily fluid tight, and in fact need not be, since the prevailing idea is to merely unite the tubes into a unit assembly. The rack continues its movement until it is stopped by the wedge 45 riding under the shoe 46 at which time the counter may be actuated. Also, at about this time the operating member 22 has thrown the switches 20 and 21 breaking the motor circuit and welding circuit. The operator may now release the pedal 9 and as the air in the cylinder becomes exhausted, the upper electrode raises, and tubes may be removed and deposited in the support or trough 43. The motor is preferably of a reversible type, and a switch box 53 having a button 51 may operate a reverse switch. The operator may now press the button 51 and the reverse action of the motor returns the rack substantially to the position shown in Fig. 1 where the reverse current is automatically broken by the opening of the switch 23. An emergency button 52 may be provided so that the operator may stop the machine at any time. Preferably the switches 20 and 21 are of a type which, when once opened, remain open until the switches 15 and 17 are again closed at the start of the next cycle of operation. Such switches are well-known to those versed in the art.

Since the rack is stopped with a relatively abrupt action, it is preferred to have a brake or the like associated with the motor. This is illustrated in Fig. 6. A brake wheel 55 is on the motor shaft, and a pivoted brake shoe 56 is normally held against the wheel as by means of a spring 57. When the motor circuit is made, a plunger 58, preferably acted upon by a solenoid 59, is caused to raise, and through the means of bell crank 60, releases the brake shoe from the brake wheel against the action of the spring. Accordingly, it will be noted that as soon as the motor circuit is broken at the end of the rack movement, the current in the solenoid 59 is also broken with the result that the spring applies the brake.

It is preferred that after the two tubes are thus welded together that they remain in a substantially straight form. Due to the fact that tube A is larger than tube B, the expansion of the metal therein, incident to the welding heat, would exert its power over that of the metal in the tube B so that there is normally a tendency for the two tubes, in their finished form, to assume a curved form, with the tube A on the outside of the curve. To meet this situation the shoe 47 has been provided. As above stated, the tubes are placed on opposite sides of this shoe. When the machine is set into operation the shoe 47 moves downwardly and bends or sets up a tension in the tube A. This will be appreciated by reference to Fig. 5 where such action is clearly shown. The tube A is held by the bracket 26 and between the roller electrodes, so that at these two points, in the case of a machine which moves the tubes in a horizontal path, the tube is restrained from movement in a vertical direction. Accordingly, the shoe 47 may depress the portion of the tube A immediately advancing to the electrodes with an action in the nature of cantilever action, thus bending the tube and setting up tension, in the metal thereof which is reverse to the curve which may be caused by applying the welding heat to the two tubes of different size. Preferably, this reverse tension is just enough to balance curving tendency so that the tube assembly when finished, remains substantially straight.

The gauge tube B is relatively small, and is ordinarily reduced to its small size from a larger tube by means of a drawing action. This drawing action or cold working the tube embrittles the metal. This is especially true where the tubes are made of steel stock, and it may be here pointed out that such tube assemblies have been, and are now being, made involving a tube structure shown in the Harry W. Bundy Patent 1,431,368, of October 10, 1922. The strip stock fashioned into tube was of steel and the plies were united by a copper welding or copper brazing process. The heat to which the center portions of the tube are subjected in the welding operation effects an annealing of the metal and particularly that of the smaller tube. However, the end portions of the small tube which remain unattached from the tube A, remain relatively stiff due to the embrittlement of the metal in the above mentioned drawing operation. Accordingly, the invention contemplates a step for annealing these ends of the small tube and this is illustrated in Fig. 8.

The tube assembly may be laid upon a supporting table 60, preferably of insulating material, where these ends are subjected to an electrical current for annealing the same. The primary circuit is illustrated at 61, and the secondary at 62, and in the secondary there may be a suitable time switch in the housing 63, which time switch is now available on the market. One conductor 64 of the secondary leads from the time switch to a manually controlled switch 65 and a conductor 66 then leads to a contact 67. Preferably a box-like structure 68 is provided which is hinged to the table at 69 and which may have an operating handle 70 and which carries a spring pressed clamp 71. One end of the tube B, for example the right hand end as shown in Fig. 8, is laid upon contact 67 and the box 8 may be swung to the position as shown, so that the tube end is clamped against the contact 67. The edge of the box may be arranged to strike a plunger 72 and depress it, thus closing the switch 65. The other conductor 73 of the secondary circuit leads to a similar arrangement at the other end of the table where it will be noted that there are like parts with the same reference characters applied. There may be an operator near each end of the table and these operators place their ends of the tube B over the contacts 67 and then swing the box structures 68 into the position shown. In this action the switches 65 are closed and the secondary circuit is made with the result that the current runs through the free ends of the tube B so that they are heated preferably to a satisfactory annealing heat. The operators may hold the box structures closed until the current is cut off by the time switch in the housing 63. The free ends of the tube B may become visibly red hot, but the intermediate portion comprising the two tubes welded together, offers more metal and accordingly less resistance to the flow of the current, so that the intermediate portion may not be appreciably heated. When the operators note that the time switch has cut off the current, the box structures may be swung open and the tube assembly just acted upon removed and a new assembly properly located. The boxes are provided for safety purposes, to prevent possibility of any flying sparks reaching the operator. The tube B accordingly now has its ends annealed so that the same may be readily bent and fashioned, as it is assembled into an automotive vehicle, or elsewhere. While the invention has been described as being particularly applicable to tubes, it is, of course, capable of being used, both as to the apparatus and method, on long lengths of metal which are not tubes or in which one length is not a tube.

I claim:

1. A machine for weld uniting two lengths of tubing of different sizes comprising, oppositely disposed electrodes for engaging the tubes, means for moving the tubes lengthwise through the electrodes, and a guide shoe adjacent the electrodes for acting upon at least one of the tubes and placing the metal thereof under a condition of strain or tension which is different than the condition of the metal in an adjacent portion of the other tube.

2. A machine for welding two lengths of tube of different diameter together comprising, oppositely disposed roller electrodes for engaging and pressing the tubes together, means for moving the tubes lengthwise between the electrodes, and a guide shoe positioned in advance of the electrodes for bending one of the tubes.

3. A machine for welding two lengths of tube of different diameter together comprising, oppositely disposed roller electrodes for engaging and pressing the tubes together, means for moving the tubes lengthwise between the electrodes, and a guide shoe positioned in advance of the electrodes for engaging one of the tubes for slightly bending and maintaining successive sections of said tube in bent form as the same is presented to the electrodes.

4. A machine for welding together two lengths of tube of different diameters comprising, opposed roller electrodes adapted to engage and press the tubes together, means for moving the tubes lengthwise between the electrodes, and a guide shoe positioned in advance of the rollers and acting upon the larger of said tubes serving to bend the said larger tube as it moves toward the electrodes with the curvature of the bend away from the smaller tube.

5. A machine for welding together two lengths of tube of different diameter comprising, oppositely disposed roller electrodes one of which is on a fixed axis, a movable support for the other, means for moving the tubes lengthwise between the electrodes, means for moving the said support to cause the electrodes to engage the tubes, and a guide device carried by the support adapted to engage one of the tubes and bend the same in advance of the electrodes.

6. A machine for welding lengths of tube together comprising, a pair of electrodes for engaging and pressing the tubes together, a rack bar, means on the rack for engaging the tubes, a driving motor, a gear cooperating with the rack bar, and driven by the motor for reciprocating the rack bar whereby the same moves the tubes lengthwise through the electrodes, stop means for limiting the movement of the rack bar, and means operating substantially simultaneously with the stop means for breaking the electrical circuit for the motor, said stop means comprising a wedge member and a shoe member for engagement therewith, and springs for backing up one of said members.

7. A machine for welding lengths of tube together comprising, a pair of electrodes, movable means for supporting one electrode whereby the electrodes may move toward each other and engage and press the tubes together, means for moving the tubes lengthwise between the electrodes, an electric motor for operating said means, controllable means for shifting the movable means for one of the electrodes, a pair of electric switches one for the welding circuit and one for the motor circuit, means for closing the switches upon movement of the said movable means, another pair of electrical switches, and an actuating member carried by the tube moving means for actuating the second pair of switches to break the respective circuits after the tubes have been moved between the electrodes.

8. A machine for welding lengths of tube together comprising, a pair of electrodes, movable means for supporting one electrode whereby the electrodes may move toward each other and engage and press the tubes together, means for moving the tubes lengthwise between the electrodes, an electric motor for operating said means, controllable means for shifting the movable means for one of the electrodes, a pair of electric switches one for the welding circuit and one for the motor circuit, means for closing the switches upon movement of the said movable means, another pair of electrical switches, an actuating member carried by the tube moving means for actuating the second pair of switches to break the respective circuits after the tubes have been moved between the electrodes, a reversing switch for the motor, and another electrical switch adapted to be actuated by said actuating member for breaking the reversing electrical circuit of the motor.

9. The method which comprises, moving two tubes which have different expanding actions when heated in contact with each other between electrodes of a welding machine to weld them together and maintaining one of the tubes in a distorted condition in advance of electrodes to counteract the differential expanding actions to obtain substantially a predetermined shape of the welded together tubes.

10. The method which comprises, moving two lengths of tube of different diameters which have different expanding actions when heated lengthwise between electrodes of a welding machine and maintaining one of the tubes in a distorted condition in advance of the electrodes to counteract the differential expanding actions to obtain a substantially straight condition in the finished welded together tubes.

11. The method which comprises, moving two lengths of tube of different diameters lengthwise between electrodes of a welding machine and maintaining the larger of said tubes in a distorted condition bent away from the smaller of said tubes in advance of the electrodes to obtain a substantially straight run of the two tubes after they are welded together.

12. An apparatus for weld uniting two lengths of metal which have differential expanding and contracting actions when heated, which comprise oppositely disposed electrodes for engaging the lengths of metal, means for moving the lengths of metal lengthwise between the electrodes to weld them together, and a guide device positioned in advance of electrodes for acting upon one of the lengths of metal and placing the metal thereof under tension to substantially counteract the tendency of the lengths of metal to distort when welded together, due to the differential expanding action.

13. The method which comprises, moving two relatively long lengths of metal, which have differential expanding and contracting actions when heated, lengthwise between electrodes of a welding machine to weld the lengths together, and maintaining one of the lengths of metal in a distorted condition in advance of the electrodes to counteract the differential expanding and contracting actions to obtain a substantially straight condition in the finished welded together lengths of metal.

BERT L. QUARNSTROM.